United States Patent [19]

Sugimoto et al.

[11] Patent Number: 5,242,334
[45] Date of Patent: Sep. 7, 1993

[54] ROCKER PIN TYPE FRICTION TRANSMISSION CHAIN

[75] Inventors: Yoshiaki Sugimoto; Hiroki Ishida, both of Tokorozawa; Nobuyuki Fujimoto, Hanno, all of Japan

[73] Assignee: Tsubakimoto Chain Co., Osaka, Japan

[21] Appl. No.: 973,637

[22] Filed: Nov. 9, 1992

[30] Foreign Application Priority Data

Nov. 7, 1991 [JP] Japan .................. 3-99410[U]

[51] Int. Cl.⁵ ............................. F16G 13/04
[52] U.S. Cl. ...................... 474/215; 474/245
[58] Field of Search ............ 474/206, 212-217, 474/245; 198/851, 853

[56] References Cited

U.S. PATENT DOCUMENTS

| 4,507,106 | 3/1985 | Cole | 474/215 |
| 4,801,289 | 1/1989 | Sugimoto et al. | 474/215 |
| 4,904,231 | 2/1990 | Zimmer | 474/214 |
| 5,026,331 | 6/1991 | Sugimoto et al. | 474/214 |

*Primary Examiner*—Douglas D. Watts
*Attorney, Agent, or Firm*—Howson & Howson

[57] ABSTRACT

In a rocker pin type friction transmission chain, the engaged surfaces of the rocker pins and pin insertion holes in the link plates are in the form of parts of an ellipse which are symmetrical with respect to the minor axis of the ellipse. This configuration is easy to machine, prevents relative rotation of the pins and the link plates, avoids cracking of the link plates due to concentrations of loads, and reduces the likelihood of fatigue failure due to excessive pressures exerted by the pins and link plates on each other.

1 Claim, 4 Drawing Sheets

ROCKER PIN TYPE FRICTION TRANSMISSION CHAIN

BRIEF SUMMARY OF THE INVENTION

This invention relates to mechanical power transmission chains and more particularly to improvements in friction transmission chains of the type used in variable ratio transmissions, wherein an endless chain is frictionally engaged with two sheaves, each sheave comprising two cone-shaped elements which are movable toward and away from each other.

In general, the chain is made up of multiple link plates, held together in overlapping relationship by pins which fit into insertion holes, two of which are formed in each link plate.

Friction transmission chains are broadly classified into two types, the circular pin type and the rocker pin type, depending on the shape of the pins which connect the link plates of the chain. In many cases the rocker pin type of chain is used to form a so-called "silent" chain. The present invention relates to a rocker pin type chain.

In a rocker pin friction transmission chain, it is desirable to prevent relative rotation of the pins in the link plates.

In one conventional form of rocker pin friction transmission chain, the abutting surfaces of the pin and link plate, through which the traction load is transmitted, are each made up of plural, contiguous, arcuate surfaces of different curvatures. The different curvatures prevent the rocker pin and the link plate from rotating relative to each other. However, the contiguous surfaces of different curvature are extremely difficult to machine.

To overcome this difficulty, U.S. Pat. No. 4,801,289, dated Jan. 31, 1989, discloses a rocker pin and insertion hole configuration in which a traction load transfer surface of the pin is formed by two concentric arcuate surfaces which are connected by a plane surface. The insertion hole in the link plate has a curved concave surface opposed to, but not abutting, the plane surface of the rocker pin. Arcuate surfaces of the insertion hole, which conform to the arcuate surfaces of the pin, are contiguous with the opposite ends of the curved concave surface. The traction load is transferred through the areas over which the convex and concave arcuate surfaces are in contact with one another.

The configuration of U.S. Pat. No. 4,801,289 is comparatively easy to machine, but the surfaces of the rocker pin and insertion hole have inflection points at which loads are concentrated when the pin and link plate tend to rotate relative to each other. The concentration of the loads can cause a crack to form in the link plate beginning at the location of one of its inflection points. The formation of such a crack can ultimately lead to breakage of the link plate.

A further improvement, which avoids the concentration of loads at inflection points, utilizes elliptical surfaces instead of concentric arcuate surfaces. In a known form of chain utilizing elliptical surfaces, the elliptical surfaces are symmetrical about the major axis of an ellipse, and the pin and insertion hole are engaged by a wedging action. The rotation-preventing force is dispersed as a distributed load over the entire wedge surface to avoid a local concentration of stress and thereby prevent breakage of the link plate. However, because elliptical curved surfaces symmetrical with respect to the major axis of an ellipse are used as wedge faces, the small wedge angle results in high pressures exerted between the engaging surfaces. These high pressures can cause deterioration in the strength of the link plate due to fatigue.

The principal object of this invention is to provide a rocker-type friction transmission chain which is easy to machine; which effectively prevents relative rotation of the rocker pins and link plates; which avoids load concentration at inflection points as a result of the tendency of the pins and link plates to rotate; and which has a reduced tendency to fail as a result of fatigue.

In accordance with the invention, the load transfer surfaces through which the traction load is transferred between the rocker pins and the link plates are in the form of elliptical curves which are symmetrical with respect to the minor axis of an ellipse. More specifically, the friction transmission chain in accordance with the invention comprises plural link plates, each link plate comprising a pair of rocker pin insertion holes, and rocker pin means located in each said insertion hole for connecting said link plates together in an endless loop, wherein each rocker pin insertion hole has an inner peripheral surface comprising a first concave traction load transfer surface engageable over a continuous surface area with a portion of the rocker pin located in said hole, a second concave traction load transfer surface also engageable over a continuous surface area with another portion of the rocker pin located in said hole, said first and second concave traction load transfer surfaces being positioned so that, by engagement with said rocker pin, they can both simultaneously transfer a traction load between said rocker pin and the link plate in which the hole is located, and a third surface continuous with said first and second surfaces, and connecting said first and second surfaces, but out of engagement with said rocker pin, the cross sections of said first and second load transfer surfaces taken on planes parallel to the length of the chain being in the shape of portions of an ellipse having major and minor axes of different lengths, and being symmetrical with respect to the minor axis of said ellipse.

Since the elliptical load transfer surfaces are engaged in a wedgewise fashion, relative rotation of rocker pins and the link plates is prevented. The engagement force is dispersed over the entire load transfer surface, so that there is no local load concentration resulting from the tendency of the pins and link plates to rotate relative to each other. Since the elliptical load transfer surfaces are in opposed relation to each other in positions symmetrical with respect to the minor axis of an ellipse, the wedge angle is relatively large, and the pressure exerted due to the wedging action is reduced.

Further objects, details and advantages of the invention will be apparent from the following detailed description, when read in conjunction with the drawings.

DETAILED DESCRIPTION

Figure 1:
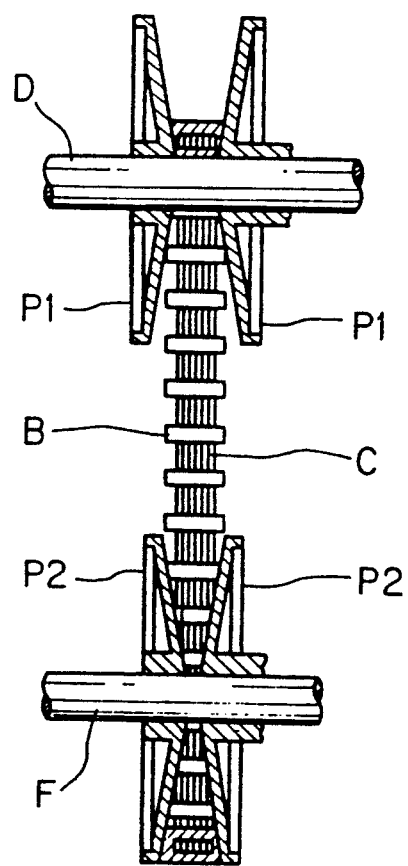
FIG. 1 is a schematic plan view, partly in section, showing a continuously variable transmission utilizing a friction transmission chain.

A typical variable speed transmission utilizing a friction transmission chain, as shown in FIG. 1, comprises a first sheave comprising pair of transmission opposed conical elements P1 mounted on a driving shaft D, and another sheave comprising a pair of opposed conical elements P2 mounted on a driven shaft F. An endless chain C, carrying a series of friction members B, extends around both sheaves to transmit a driving force from one sheave to the other. The spacing between sheave elements P1 and the spacing between sheave elements P2 can be expanded and contracted to change the position of contact of friction members B with the opposed conical surfaces of the sheave elements, thereby changing the speed ratio between the two shafts D and F, so that a continuously variable speed transmission is achieved.

In a conventional rocker pin type friction transmission chain, such as disclosed in laid open Japanese Patent application 99142/1984, the traction load is transferred from one chain element to another by the abutting engagement of a rocker pin with a rocker pin insertion hole formed in a link plate of the chain. The abutting engagement of the rocker pin with the insertion hole takes place over a continuous surface which comprises plural arcuate surfaces of different curvatures contiguous with one another. The different curvatures prevents the rocker pin and the link plate from rotating relative to each other. A problem with the use of plural, contiguous arcuate surfaces of different curvature is that it is extremely difficult to machine them.

Figure 4:
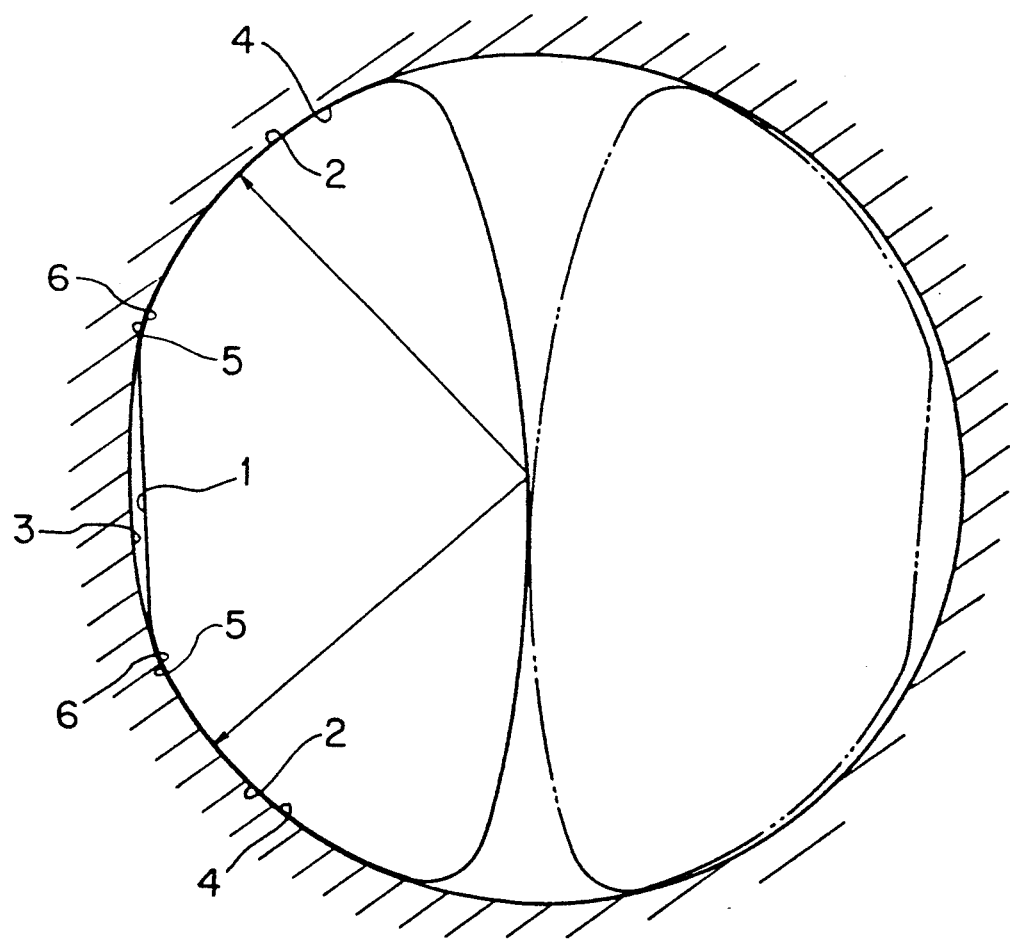
FIG. 4 is schematic view showing in side elevation, a rocker pin insertion hole with rocker pins in accordance with another embodiment of a prior art variable transmission friction chain.

To overcome this difficulty, U.S. Pat. No. 4,801,289, dated Jan. 31, 1989, discloses a rocker pin and insertion hole arrangement corresponding to that shown in FIG. 4 of this application. In FIG. 4, a traction load transfer surface is formed by two concentric arcuate surfaces 2 connected by a plane surface 1. The insertion hole in the link plate has a curved concave surface 3 opposed to, but not abutting, plane surface 1 of the rocker pin. Arcuate surfaces 4 of the insertion hole are contiguous with the opposite ends of curved concave surface 3, and conform to arcuate convex surfaces 2 of the rocker pin. A traction load is transferred over the areas through which convex surfaces 2 and concave surfaces 4 are in contact with one another.

Because the curved concave surface 3 and the arcuate concave surfaces 4 are of different curvature, inflection points 6 are formed in the insertion hole. Likewise inflection points 5 are formed in the rocker pin where plane surface 1 meets arcuate convex surfaces 2. Relative rotation of the rocker pin and the link plate is prevented by engagement of an inflection point 5 of the rocker pin with an inflection point 6 of the insertion hole.

In the pin and insertion hole in FIG. 4, since convex surfaces 2 and concave surfaces 4 are arcuate and concentric, it is easy to machine them to provide for fitting abutment so that the technical problems of the abovementioned laid open Japanese Application 99142/1984 can be overcome. However, since the arcuate convex surfaces 2 and the arcuate concave surfaces 4 are concentric arcuate surfaces, they would rotate relative to each other but for the engagement of inflection points 5 and 6. Thus, the load produced by the prevention of relative rotation is concentrated at inflection points 5 and 6. The concentration of the load can cause a crack to form in the link plate beginning at the location of inflection point 6. The formation of such a crack will ultimately lead to breakage of the link plate.

Figure 3:
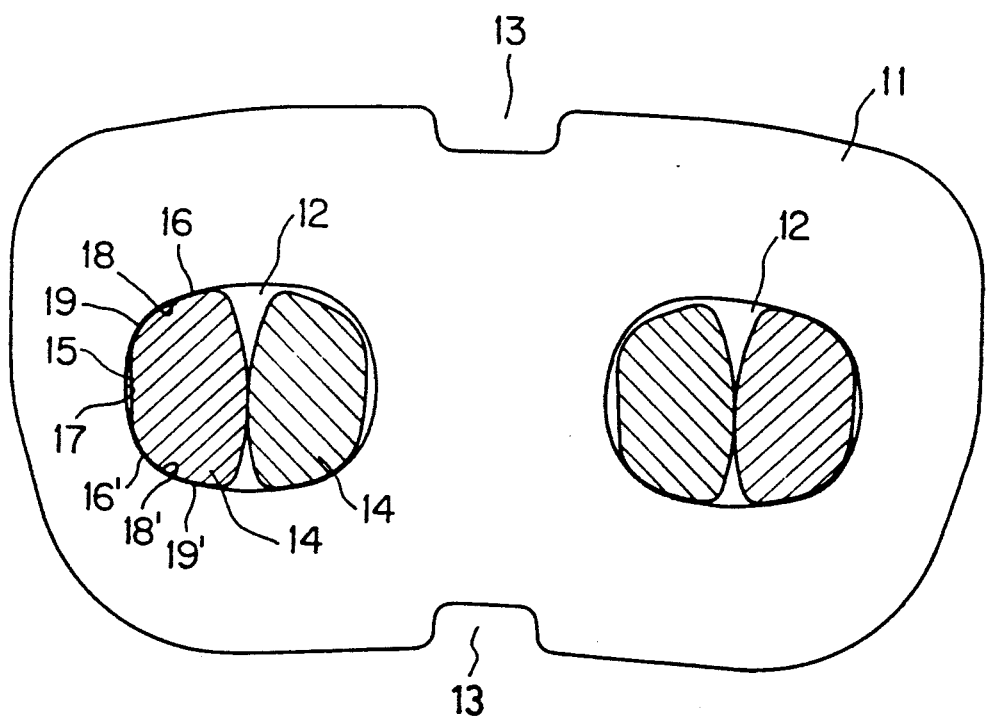
FIG. 3 is a side elevation, partly in section, showing a link plate and rocker pins in accordance with one embodiment of a prior art variable transmission friction chain.

To solve the problems caused by concentration of the load at the inflection points, Japanese Utility Model Application No. 126443/1990 discloses the arrangement shown in FIG. 3 of the present application. Instead of concentric arcuate convex surfaces 2, and arcuate concave surfaces 4, as in FIG. 4, the of FIG. 3 utilizes elliptical convex curved surfaces 19 and 19' on the rocker pin and conforming elliptical concave surfaces 18 and 18' in the periphery of the insertion hole. The load in the chain is transferred from the rocker pin to the link plate, or from the link plate to the rocker pin, by engagement of these surfaces. Both elliptical surfaces 19 and 19', and both elliptical surfaces 18 and 18', are symmetrical with respect to the major axis of an ellipse, and relative rotation of the link plate and rocker pin is prevented by a wedge angle defined by elliptical curved surfaces 19 and 19'. The rotation-preventing force is dispersed as a distributed load over the entire wedge surface to avoid a local concentration of stress, and thereby prevent breakage of the link plate.

More particularly, in FIG. 3, a link plate 11 is provided with insertion holes 12 and cutout portions 13 for engagement with a friction transmission member. A pair of rocker pins 14 are each formed with a plane portion 15 which does not transfer a load, and load transfer convex portions 16 and 16'. Insertion holes 12 are each formed with a non-load bearing concave portion 17 opposite to plane portion 15, and load transferring, elliptical, concave portions 18 and 18'. These concave portions of the insertion hole come into fitting abutment with elliptical surfaces 19 and 19' of the rocker pin.

A problem in the arrangement of FIG. 3 is that, because elliptical curved surfaces symmetric with respect to the major axis of an ellipse are used as wedge faces, the small wedge angle results in high pressures exerted between surfaces 18 and 19 and between surfaces 18' and 19'. These high pressures can cause deterioration in the strength of the link plate due to fatigue.

Figure 2:
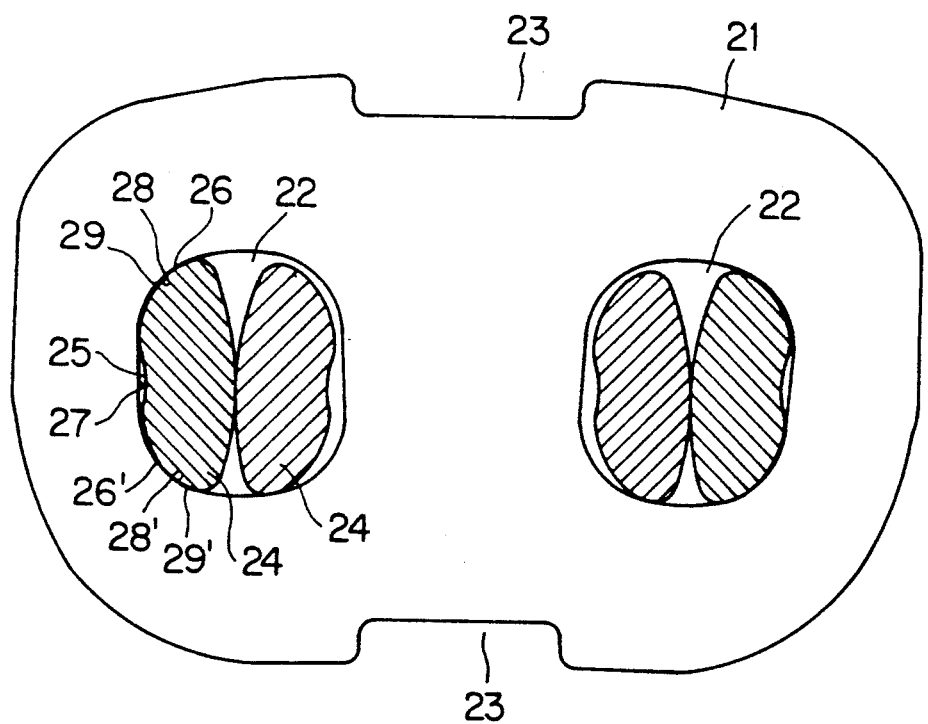
FIG. 2 is a side elevation, partly in section, showing a link plate and rocker pins in accordance with the invention.

In the present invention, as shown in FIG. 2, a link plate 21 has rocker pins 24 located in rocker pin insertion holes 22 formed in the link plate. Centrally, on the upper and lower sides of the link plate, there are formed cutout portions 23 for engagement with an I-shaped friction transmission member (not shown in FIG. 2) corresponding to B in FIG. 1.

The outer periphery on the traction load transfer surface side of each rocker pin 24 is shaped to provide a centrally positioned non-load transfer surface portion 25, and convex load transfer convex portions 26 and 26', which are contiguous to the respective ends of the non-load transfer surface portion 25. On the other hand, an inner periphery on the traction load transfer surface side of the insertion hole 22 is shaped to provide a concave non-load transfer surface portion 27, which is opposed, without abutment, to surface portion 25 of the rocker pin. The insertion hole is also formed to provide concave load transfer portions 28 and 28', which are in fitting abutment with the load transfer surface portions 26 and 26' of the rocker pin. The concave load transfer portions 28 and 28' are contiguous with the respective ends of the non-load transfer surface portion 27.

Thus, convex portion 26 and concave portion 28 are in fitting engagement with each other over a first curved contact area 29. Similarly, convex portion 26' and concave portion 28' are in fitting engagement with each other over a second curved contact area 29'. These first and second curved contact areas 29 and 29' are elliptical in shape, and are in symmetric positions with respect to the minor axis of an ellipse. More specifically, the cross sections of contact areas 29 and 29', taken on planes parallel to the length of the chain are in the shape of portions of an ellipse having major and minor axes of different lengths, and are symmetrical with respect to the minor axis of the ellipse The elliptical curved surfaces 29 and 29' are in opposed relation to each other on both sides of the nonload transfer surface portions 25 and 27 and form a wedge which prevents relative rotation of the link plate and the rocker pins. Therefore, the load transferring convex portions 26 and 26' of the rocker pin are in fitting abutment in a wedged condition with the load transferring concave portions 28 and 28' of the insertion hole.

In accordance with the invention, since the traction load transferring concave surfaces of the insertion hole are spaced apart from each other at both ends of a nonload transferring surface portion which is not in abutment with the rocker pin, it is easy to machine the insertion hole so that the two spaced load transferring concave surfaces come into abutment with the rocker pin. This is an advantage over the device disclosed in Japanese laid-open Patent Application 99142/1984, in which it is necessary to carry out machining so that all of three arcuate surfaces of different curvatures come into abutment with corresponding surfaces of a rocker pin.

Since the load transfer concave surfaces are opposed to each other and form a wedge, the presence between them of a non-load transferring surface portion which does not come into abutment with the rocker pin facilitates the wedgewise fitting of the rocker pin into the insertion hole. This enhances the wedging forces between the cooperating concave and convex load transferring surfaces and ensures a good fit between the load transferring surfaces over their entire areas, to prevent relative rotation of the insertion hole and the rocker pin and to distribute the relative rotation preventing force over the entire area of abutment of the load transferring surfaces. This avoids concentration of loads on inflection points and prevents cracking and ultimate breakage of the link plate.

Further, since in FIG. 2 the two elliptical contact areas over which the traction load is transferred are in opposed relation to each other to form a wedge, and are in symmetric positions with respect to the minor axis of an ellipse, the wedge angle is larger than that of elliptical contact areas located in symmetric positions with respect to the major axis of an ellipse, as in FIG. 3. Consequently, the pressure exerted by the wedge action is reduced, resulting in greater resistance of the link plate to fatigue failure. This is an outstanding effect.

It will be apparent that various modifications can be made to the chain structure and to the pin and insertion hole configurations without departing from the scope of the invention as defined in the following claim.

We claim:

1. A friction transmission chain comprising plural link plates, each link plate comprising a pair of rocker pin insertion holes, and rocker pin means located in each said insertion hole for connecting said link plates together in an endless loop, wherein each rocker pin insertion hole has an inner peripheral surface comprising a first concave traction load transfer surface engageable over a continuous surface area with a portion of the rocker pin located in said hole, a second concave traction load transfer surface also engageable over a continuous surface area with another portion of the rocker pin located in said hole, said first and second concave traction load transfer surfaces being positioned so that, by engagement with said rocker pin, they can both simultaneously transfer a traction load between said rocker pin and the link plate in which the hole is located, and a third surface continuous with said first and second surfaces, and connecting said first and second surfaces, but out of engagement with said rocker pin, the cross sections of said first and second load transfer surfaces taken on planes parallel to the length of the chain being in the shape of portions of an ellipse having major and minor axes of different lengths, and being symmetrical with respect to the minor axis of said ellipse.

* * * * *